United States Patent
Cheng et al.

(10) Patent No.: US 9,172,520 B1
(45) Date of Patent: Oct. 27, 2015

(54) TERMINAL, NETWORK NODE, SYSTEM AND METHODS FOR SOFT BUFFER HANDLING IN CARRIER AGGREGATION

(71) Applicant: TELEFONAKTIEBOLAGET L M ERICSSON (PUBL), Stockholm (SE)

(72) Inventors: Jung-Fu Cheng, Fremont, CA (US);
Dirk Gerstenberger, Vallentuna (SE);
Daniel Larsson, Vallentuna (SE);
Christian Skärby, Stockholm (SE);
Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/320,934

(22) Filed: Jul. 1, 2014

Related U.S. Application Data

(63) Continuation of application No. 13/293,580, filed on Nov. 10, 2011, now Pat. No. 8,797,957.

(60) Provisional application No. 61/413,060, filed on Nov. 12, 2010.

(51) Int. Cl.
G08C 25/02 (2006.01)
H04L 12/26 (2006.01)
H04L 5/00 (2006.01)
H04W 72/04 (2009.01)
H04L 1/18 (2006.01)

(52) U.S. Cl.
CPC ............ H04L 5/0055 (2013.01); H04L 1/1835 (2013.01); H04W 72/044 (2013.01); H04L 1/1864 (2013.01); H04L 1/1896 (2013.01)

(58) Field of Classification Search
CPC ... H04L 1/1835; H04L 1/1864; H04L 1/1896; H04L 1/1874; H04L 5/005; H04W 72/0044; H04W 72/04

USPC .......... 714/748, 749, 746, 741; 370/252, 241, 370/310
See application file for complete search history.

(56) References Cited

U.S. PATENT DOCUMENTS

| | | | |
|---|---|---|---|
| 8,271,843 B2 | 9/2012 | Tseng | |
| 8,286,047 B2 | 10/2012 | Che et al. | |
| 8,402,336 B2 * | 3/2013 | McBeath et al. | 714/749 |
| 8,594,029 B2 * | 11/2013 | Torsner et al. | 370/329 |
| 8,751,890 B2 * | 6/2014 | Mueller-Weinfurtner et al. | 714/748 |
| 9,019,882 B2 * | 4/2015 | Bergquist et al. | 370/311 |
| 2005/0176437 A1 | 8/2005 | Mir | |
| 2006/0034285 A1 * | 2/2006 | Pirskanen et al. | 370/394 |
| 2008/0225766 A1 * | 9/2008 | Roy et al. | 370/310 |
| 2010/0050034 A1 | 2/2010 | Che et al. | |
| 2011/0035639 A1 | 2/2011 | Earnshaw et al. | |

OTHER PUBLICATIONS

3rd Generation Partnership Project; Technical Specification Group Radio Access Network; Evolved Universal Terrestrial Radio Access (E-UTRA); Multiplexing and channel coding (Release 9). 3GPP TS 36.212 v9.3.0 (Sep. 2010).

3rd Generation Partnership Project; Technical Specification Group Radio Access Network; Evolved Universal Terrestrial radio Access (E-UTRA); Physical layer procedures (Release 9). 3GPP TS 36.213 v9.3.0 (Sep. 2010).

* cited by examiner

*Primary Examiner* — Christine Tu

(57) ABSTRACT

A terminal (e.g., mobile communication device, UE) and a method are described herein for allocating a soft buffer after interacting with a network node (e.g., base station, eNB). In addition, a network node (e.g., base station, eNB) and a method are described herein that facilitates robust operations during a reconfiguration period while a terminal allocates a soft buffer located therein.

22 Claims, 10 Drawing Sheets

TERMINAL, NETWORK NODE, SYSTEM AND METHODS FOR SOFT BUFFER HANDLING IN CARRIER AGGREGATION

CLAIM OF PRIORITY

This application is a continuation application of U.S. patent application Ser. No. 13/293,580, filed Nov. 10, 2011, now U.S. Pat. No. 8,797,957, which claims the benefit of U.S. Provisional Patent Application Ser. No. 61/413,060 filed on Nov. 12, 2010. The contents of these documents are hereby incorporated by reference herein.

TECHNICAL FIELD

The present invention relates to a terminal (e.g., mobile communication device, UE) and a method for allocating a soft buffer after interacting with a network node (e.g., base station, eNB). In addition, the present invention relates to a network node (e.g., base station, eNB) and a method that facilitates robust operations during a reconfiguration period while a terminal allocates a soft buffer located therein.

BACKGROUND

The following abbreviations are herewith defined, at least some of which are referred to within the following description about the prior art and/or the present invention.
3GPP Third Generation Partnership Project
CC Component Carrier
DL Downlink
eNB Evolved Node B
FDD Frequency Division Duplexing
HARQ Hybrid Automatic Repeat Request
HSDPA High-Speed Downlink Packet Access
IMT International Mobile Telecommunications
LTE Long-Term Evolution
MIMO Multiple-Input and Multiple-Output
PDSCH Physical Downlink Shared Channel
RRC Radio Resource Control
UE User Equipment
UL Uplink
WiMAX Worldwide Interoperability for Microwave Access
LTE Rel-8 HARQ Operation and Redundancy Versions HARQ incremental redundancy is used in LTE. Thus, instead of re-transmitting the same portion of the codeword different redundancy versions are retransmitted yielding an extra gain over Chase combining. In this scheme, the receiver side (e.g., terminal side, UE side) would ideally have a full soft buffer available such that the received soft values for the entire codeword can be stored within the soft buffer. However, due to the terminal complexity and cost concerns, the soft buffer size in a terminal is limited.

Thus, for higher rate transmissions where larger codewords are sent from a transmitter (e.g., base station, eNB), the terminal may have only a limited sized soft buffer and would not able to store the complete codeword. As a result, the transmitter (e.g., eNB) and terminal (e.g., UE) must have the same understanding about the soft buffer size since otherwise the base station may transmit coded bits which the terminal cannot store or worse, it does not know these are other bits and confuses them with the bits it stores. FIG. 1 (PRIOR ART) depicts a simplified complete codeword and also how many softbits the terminal can store.

If the eNB and terminal have the same understanding about the soft buffer size then the eNB will never transmit coded bits which the terminal cannot store in the soft buffer. Instead, the eNB takes only those coded bits that are stored by terminal and uses those bits for (re-)transmissions. This situation can be depicted by the circular soft buffer 200 shown in FIG. 2 (PRIOR ART) where it should be appreciated that the complete circle corresponds to the size of the soft buffer 200 and not to the entire codeword. In the first transmission, utilizing the circular soft buffer 200 some or all systematic bits and none or some parity bits are transmitted depending on the code rate. In a retransmission the starting position is changed and bits corresponding to another part of the circumference of the circular soft buffer 200 are transmitted.

In Rel-8 LTE FDD, each terminal has up to 8 HARQ processes per component carrier and each HARQ process can contain up to two sub-processes for supporting dual-codeword MIMO transmissions. The design in Rel-8 LTE is to divide the available soft buffer equally into the configured number of HARQ processes. Each of the said divided soft buffer can be used to store soft values of the received codewords. In case of dual-codeword MIMO transmission, the divided soft buffer shall be further divided equally to store the soft values of the two received codewords. It should be noted that a codeword is an entity of a transport block that is coded and transmitted and there can be two codewords per component carrier.

More specifically, in 3GPP Technical Specification 36.212, V9.3.0 (2010-09_Section 5.1.4.1.2 "Bit collection, selection and transmission" (the contents of which are incorporated by reference herein) the soft buffer size allocation is provisioned as below:

"The circular buffer of length $K_w = 3K_\Pi$ for the r-th coded block is generated as follows:

$$w_k = v_k^{(0)} \text{ for } k=0,\ldots,K_\Pi-1$$

$$w_{K_\Pi+2k} = v_k^{(1)} \text{ for } k=0,\ldots,K_\Pi-1$$

$$w_{K_\Pi+2k+1} = v_k^{(2)} \text{ for } k=0,\ldots,K_\Pi-1$$

Denote the soft buffer size for the transport block by $N_{IR}$ bits and the soft buffer size for the r-th code block by $N_{cb}$ bits. The size $N_{cb}$ is obtained as follows, where C is the number of code blocks computed in section 5.1.2:

$$-N_{cb} = \min\left(\left\lfloor\frac{N_{IR}}{C}\right\rfloor, K_w\right)$$

for downlink turbo coded transport channels $-N_{cb} = K_w$ for uplink turbo coded transport channels
where $N_{IR}$ is equal to:

$$N_{IR} = \left\lfloor\frac{N_{soft}}{K_{MIMO} \cdot \min(M_{DL\_HARQ}, M_{limit})}\right\rfloor$$

where:
$N_{soft}$ is the total number of soft channel bits . . .
$K_{MIMO}$ is equal to 2 if the UE is configured to receive PDSCH transmissions based on transmission modes 3, 4 or 8 . . .
$M_{DL\_HARQ}$ is the maximum number of DL HARQ processes . . .
$M_{limit}$ is a constant equal to 8.
w is the virtual circular buffer
k is an index for each bit stream
$K_\Pi$ is the total number of bits for each bit stream"

FIG. 3 (PRIOR ART) illustrates a LTE Rel-8 terminal 300 with a soft buffer 302 that has been allocated for single-codeword transmission modes or when the PDSCH transmission mode is other than mode 3, 4 or 8. In this example, the terminal 300 has a sub-buffer SB0, SB1 . . . SB7 reserved for each codeword. FIG. 4 (PRIOR ART) illustrates the LTE Rel-8 terminal 300 where the soft buffer 302 has been allocated for dual-codeword transmission modes or when the PDSCH transmission mode is mode 3, 4 or 8. In this example, the terminal 300 has a sub-buffer SB0a, SB0b, SB1a, SB1b . . . SB7a, SB7b reserved for each codeword where each sub-buffer SB0a, SB0b, SB1a, SB1b . . . SB7a, SB7b is only half the size of the previous operating case shown in FIG. 3 (PRIOR ART). Basically, each HARQ-process has a buffer and each HARQ process can contain up to two codewords, and each codeword has a sub-buffer. It is clear that the soft buffer limitation problem is particularly acute in the dual-codeword MIMO transmission operation. This soft buffer limitation reduces the effectiveness of the soft combining gains from incremental redundancy retransmissions.

A person skilled in the art will readily appreciate that a carrier has 8 HARQ process in FDD and each HARQ process can have either one or two transport blocks depending how the carrier is configured. Furthermore, each transport block is mapped to a codeword. Thus, the LTE Rel-8 FDD terminal 300 which supports only one carrier can store 8 HARQ process, if the HARQ process contains two transport blocks, i.e. also two codewords, then the soft buffer 302 for that HARQ process is divided into two sub-buffers as in FIG. 4 (PRIOR ART). In contrast, if the LTE Rel-8 terminal 300 has only one codeword per HARQ process then the soft buffer 302 is divided as shown in FIG. 3 (PRIOR ART).

Carrier Aggregation

The LTE Rel-8 standard has recently been standardized and supports bandwidths up to 20 MHz. However, in order to meet the IMT-Advanced requirements, 3GPP has initiated work on LTE Rel-10. One of the parts of LTE Rel-10 is to support bandwidths larger than 20 MHz. One important requirement for LTE Rel-10 is to assure backward compatibility with LTE Rel-8. This requirement should also include spectrum compatibility. That would imply that a LTE Rel-10 carrier, wider than 20 MHz, should appear as a number of LTE carriers to an LTE Rel-8 terminal. Each such carrier can be referred to as a component carrier (note: a component carrier can also be referred to as a cell in 3GPP). In particular, for early LTE Rel-10 deployments it can be expected that there will be a smaller number of LTE Rel-10 capable terminals when compared to many LTE Rel-8 legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straight-forward way to obtain this would be by means of Carrier Aggregation. Carrier Aggregation implies that an LTE Rel-10 terminal can receive multiple component carriers, where the component carriers have, or at least the possibility to have, the same structure as a Rel-8 carrier. Carrier Aggregation between a base station 500 and the LTE Rel-10 terminal 502 which has a soft buffer 504 has been illustrated in FIG. 5 (PRIOR ART).

Soft Buffer Operation in Carrier Aggregation

In LTE each component carrier operates with its own set of eight HARQ processes for FDD (for TDD see Table 7-1 in the 3GPP Technical Specification 36.213 V. 9.3.0 dated 2010 Oct. 3—the contents of which are incorporated by reference herein). Since the total soft buffer memory needs to be shared among component carriers, the soft buffer size per component carrier can vary depending on the number of configured component carriers and the number of configured MIMO transmission modes for each component carrier. The available soft buffer size for each codeword also depends on how the soft buffer is divided and allocated amongst all codewords. Two possible soft buffer allocation methods for the LTE Rel-10 terminal are considered and discussed next.

The first method divides the total soft buffer equally amongst the number of configured or activated component carriers. Each of the sub-buffers is then treated as a buffer in the Rel-8 operations. That is, each of the sub-buffers is then divided into the number of HARQ processes and then further divided into the number of MIMO codewords. More specifically, the soft buffer size for a codeword on the component carrier $n_c$ is given by:

$$N_{IR}(n_c) = \left\lfloor \frac{N_{soft}/N_{carrier}}{K_{MIMO}(n_c) \cdot \min(M_{DL\_HARQ}, M_{limit})} \right\rfloor \quad (1)$$

where $N_{carrier}$ is the number of configured/activated component carriers, $n_c$ is a index of the component carriers (i.e., $n_c=0,1,\ldots,N_{carrier}-1$), and $K_{MIMO}(j)$ is the number codewords configured for the component carrier j. FIG. 6 (PRIOR ART) illustrates a LTE Rel-10 terminal 502 which has a soft buffer 504 that is allocated per this method where in this example a case is considered where CC0 is configured for dual-codeword MIMO and CC1 is configured for single-codeword transmissions. While this allocation method is easy to implement, it also retains the drawback from LTE Rel-8 where the soft buffer size of the transport block on the carrier with two codewords transmission is still very limited. This limitation reduces the effectiveness of soft combining gains from incremental redundancy retransmissions.

A second method aims to provide full flexibility in soft buffer allocation. In this case, the total number of codewords from all component carriers and the associated configured MIMO modes are accounted for in the soft buffer allocation. In particular, the soft buffer is then equally divided amongst all codewords. More specifically, the soft buffer size for a codeword is given by the following:

$$N_{IR} = \left\lfloor \frac{N_{soft}}{\sum_{j=0}^{N_{carrier}-1} K_{MIMO}(j) \cdot \min(M_{DL\_HARQ}, M_{limit})} \right\rfloor \quad (2)$$

FIG. 7 (PRIOR ART) illustrates a LTE Rel-10 terminal 502 which has a soft buffer 504 that is allocated per this method where in this example a case is considered where CC1 is configured for dual-codeword MIMO and CC2 is configured for single-codeword transmissions. It can be observed that the second allocation method improves upon the first allocation method by increasing the soft buffer size reserved for codewords in dual-codeword MIMO transmission modes. However, such an allocation freely changes the boundaries between different HARQ processes. This places a high complexity in hardware implementation and introduces many potential operation error scenarios, all of which had received extensive discussion during the design of Rel-8 LTE. In addition, in the second allocation method the soft buffer boundaries change which means operating errors in one HARQ process can spill over to another HARQ process, which magnifies the severity of any one HARQ operation error.

Reconfiguration Period

In all of the aforementioned proposals, the soft buffer sizes change if the number of component carriers or the transmission mode of one/multiple component carriers is changed altering the transport blocks per subframe. In LTE, the re-configuration of component carriers is done via RRC signaling (RRCConnectionReconfiguration message) which is not synchronized, i.e. the terminal has up to 15 ms to allocated the soft buffer and apply the new RRC configuration after reception from the eNB. However, the eNB does not know when exactly the terminal uses the updated RRC configuration. The terminal acknowledges successful application of the new configuration by transmitting RRCConnectionReconfigurationComplete to the eNB (already with the new configuration) but until the eNB has received this message it does not know for certain that the terminal is using the allocated soft buffer per the new configuration. The time before the eNB knows that the UE has applied the new configuration to the soft buffer can also be longer, if there are any of retransmission of the UL and DL RRC messages between the terminal and the eNB. In any case, if such a re-configuration changes the number of component carriers or the transport blocks per component carrier then the soft buffer size changes. As explained above, it is important that eNB and terminal have same understanding of soft buffer size since otherwise the terminal miss-interprets received bits and corrupts its soft buffer.

In view of the foregoing, it can be seen that there has been and still is a need to address the aforementioned shortcomings and other shortcomings associated with the terminal's soft buffer allocation method and the reconfiguration period where the eNB is not sure if the terminal has applied a new RRC configuration. These need and other needs are satisfied by the particular embodiments of the present invention.

SUMMARY

A terminal (e.g., mobile communication device, UE), a network node (e.g., base station, eNB), and methods are described in the independent claims of the present application. Advantageous embodiments of the terminal, the network node, the methods are described in the dependent claims.

In one aspect, the present invention provides a terminal (e.g., LTE Rel-10 terminal) that allocates a soft buffer located therein after interacting with a network node. The terminal comprises a processor and a memory that stores processor-executable instructions where the processor interfaces with the memory and executes the processor-executable instructions to enable following: (a) analyze a reconfiguration message received from the network node, where the reconfiguration message indicates a new reconfiguration of component carriers or a transmission mode of one or more component carriers that will be used by the network node; and (b) allocate the soft buffer based on the new reconfiguration message by: (i) equally dividing a size of the soft buffer into sub-buffers amongst a number of HARQ processes; and (ii) dividing each sub-buffer into a total number of codewords across all configured or activated component carriers. An advantage of the terminal is that the entire soft buffer memory located therein is fully utilized.

In another aspect, the present invention provides a method implemented by a terminal (e.g., LTE Rel-10 terminal) for allocating a soft buffer located therein after interacting with a network node. The method comprises the steps of: (a) analyzing a reconfiguration message received from the network node, where the reconfiguration message indicates a new reconfiguration of component carriers or a transmission mode of one or more component carriers that will be used by the network node; and (b) allocating the soft buffer based on the new reconfiguration message by: (i) equally dividing a size of the soft buffer into sub-buffers amongst a number of HARQ processes; and (ii) dividing each sub-buffer into a total number of codewords across all configured or activated component carriers. An advantage of the method is that the terminal's entire soft buffer memory is fully utilized.

In yet another aspect, the present invention provides a network node (e.g., base station, eNB) that interacts with a terminal. The network node comprises: (a) a processor; and (b) a memory that stores processor-executable instructions where the processor interfaces with the memory and executes the processor-executable instructions to enable following: (i) understanding how the terminal allocates a soft buffer located therein, wherein the terminal allocates the soft buffer by: equally dividing a size of the soft buffer into sub-buffers amongst a number of Hybrid Automatic Repeat Requests (HARQ) processes; and dividing each sub-buffer into a total number of codewords across all configured or activated component carriers. An advantage of this is that the network node by having same understanding about the soft buffer will not transmit coded bits the terminal cannot store.

In still yet another aspect, the present invention provides a method implemented by a network node (e.g., base station, eNB) that interacts with a terminal. The method comprises the step of understanding how the terminal allocates a soft buffer located therein, wherein the terminal allocates the soft buffer by: equally dividing a size of the soft buffer into sub-buffers amongst a number of Hybrid Automatic Repeat Requests (HARQ) processes; and dividing each sub-buffer into a total number of codewords across all configured or activated component carriers. An advantage of this is that the network node by having same understanding about the soft buffer will not transmit coded bits the terminal cannot store.

In yet another aspect, the present invention provides a network node (e.g., base station, eNB) that facilitates robust operations during a reconfiguration period while a terminal (e.g., LTE Rel-10 terminal, LTE Rel-8 terminal) allocates a soft buffer located therein. The network node comprises a processor and a memory that stores processor-executable instructions where the processor interfaces with the memory and executes the processor-executable instructions to enable following: (a) send, to the terminal, a reconfiguration message which indicates a new reconfiguration of component carriers or a transmission mode of one or more component carriers to be used to interface with the terminal; and (b) while waiting to receive a reconfiguration confirmation message indicating that the terminal has allocated the soft buffer based on the received reconfiguration message, ensure not to transmit coded bits that the terminal cannot store or would corrupt the soft buffer. An advantage of this solution is that the network node will not corrupt the terminal's soft buffer.

In yet another aspect, the present invention provides a method implemented by a network node (e.g., base station, eNB) for facilitating robust operations during a reconfiguration period while a terminal (e.g., LTE Rel-10 terminal, LTE Rel-8 terminal) allocates a soft buffer located therein. The method comprises the steps of: (a) sending, to the terminal, a reconfiguration message which indicates a new reconfiguration of component carriers or a transmission mode of one or more component carriers to be used to interface with the terminal; and (b) while waiting to receive a reconfiguration confirmation message indicating that the terminal has allocated the soft buffer based on the received reconfiguration message, ensuring not to transmit coded bits that the terminal cannot store or would corrupt the soft buffer. An advantage of this solution is that the network node will not corrupt the terminal's soft buffer.

In yet another aspect, the present invention provides a terminal that facilitates robust operations during a reconfiguration period when communicating with a network node. The terminal comprising: (a) a processor; and (b) a memory that stores processor-executable instructions where the processor interfaces with the memory and executes the processor-executable instructions to enable following: (i) receive, from the network node, a reconfiguration message which indicates a new reconfiguration of component carriers or a transmission mode of one or more component carriers to be used to interface with the network node; (ii) allocate a soft buffer based on the received reconfiguration message; and (iii) using a soft buffer size of the soft buffer before receipt of the reconfiguration message for a Hybrid Automatic Repeat Requests (HARQ) process until at least one of the following: a new transport block using the HARQ process is received from the network node; subframe n+x occurs where n denotes a subframe when the reconfiguration message was transmitted to the terminal and x denotes an arbitrary constant, or subframe m+x occurs where m denotes a subframe when the reconfiguration confirmation message was transmitted from the terminal to the network node and x denotes an arbitrary constant. An advantage of this solution is that the terminal's soft buffer will not be corrupted.

In still yet another aspect, the present invention provides a method implemented by a terminal for facilitating robust operations during a reconfiguration period when communicating with a network node, the method comprising the steps of: (a) receiving, from the network node, a reconfiguration message which indicates a new reconfiguration of component carriers or a transmission mode of one or more component carriers to be used to interface with the network node; (b) allocating a soft buffer based on the received reconfiguration message; and (c) using a soft buffer size of the soft buffer before receipt of the reconfiguration message for a Hybrid Automatic Repeat Requests (HARQ) process until at least one of the following: a new transport block using the HARQ process is received from the network node; subframe n+x occurs where n denotes a subframe when the reconfiguration message was transmitted to the terminal, or subframe m+x occurs where m denotes a subframe when the reconfiguration confirmation message was transmitted from the terminal to the network node.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 8:
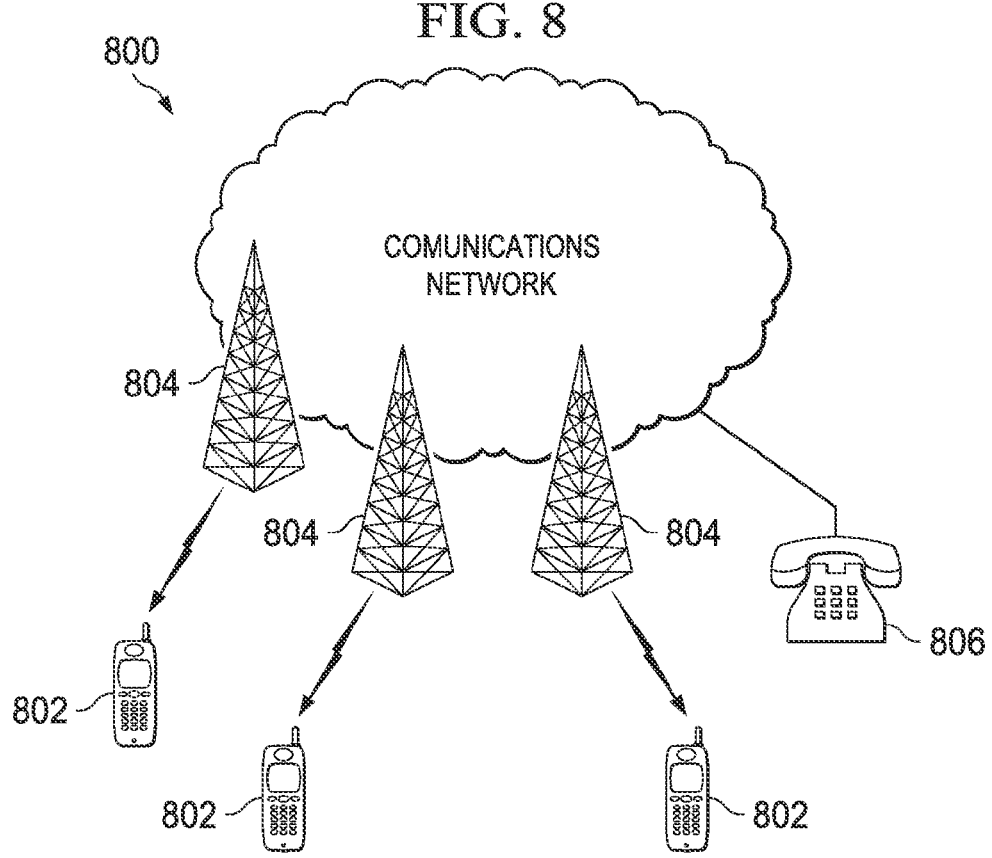
FIG. 8 is a diagram of an exemplary wireless communication network including one or more terminals and one or more network nodes in accordance with an embodiment of the present invention.

Referring to FIG. 8, there is a diagram of an exemplary wireless communication network 800 (e.g., LTE network 800) including one or more instances of terminals 802 (e.g., mobile communication devices 802, UEs 802) and one or more network nodes 804 (e.g., base stations 804, eNBs 804) capable of communicating with the terminals 802, along with additional elements suitable to support communication between terminals 802 or between one terminal 802 and another communication device 806 (such as a landline telephone 806). The skilled person will appreciate that the exemplary wireless communication network 800 includes many components that are well known in the art but for clarity they are not described herein while the terminals 802 and the network nodes 804 which are relevant to the present invention are described in detail herein. In particular, the terminal 802 (e.g., LTE Rel-10 UE 802) is described first with respect to FIGS. 9-15 to explain in detail one aspect of the present invention related to a method for allocating a soft buffer. Thereafter, the network node 804 is described with respect to FIGS. 16-19 to explain in detail another aspect of the present invention related to a method for facilitating robust operations during a reconfiguration period while the terminal 802 (e.g., LTE Rel-8 UE 802, LTE Rel-10 UE 802) allocates a soft buffer located therein.

Figure 9:
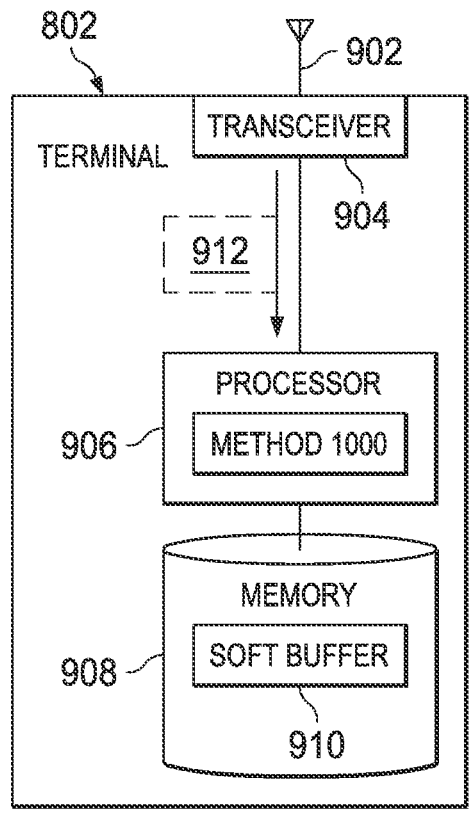
FIG. 9 is a block diagram illustrating in greater detail the terminal shown in FIG. 8 configured in accordance with an embodiment of the present invention.
Figure 10:
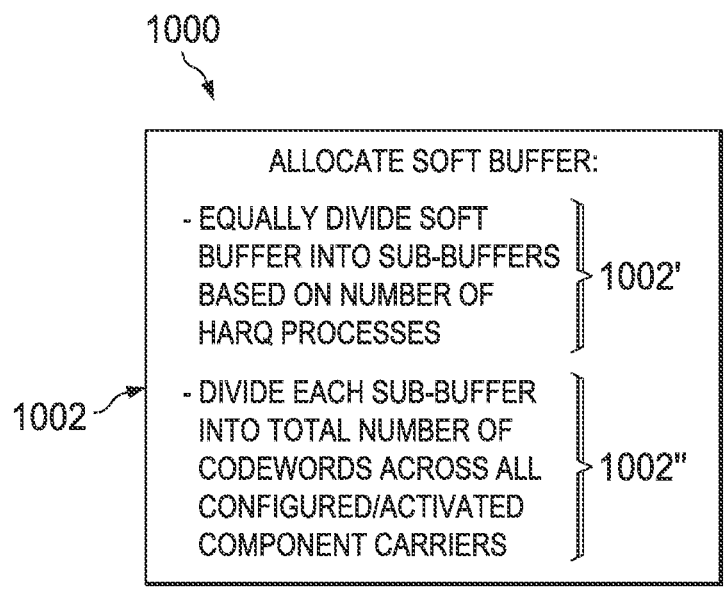
FIG. 10 is a flowchart respectively illustrating an exemplary method implemented by the terminal shown in FIGS. 8-9 for allocating a soft buffer located therein after interacting with a network node in accordance with an embodiment of the present invention.

Referring to FIGS. 9 and 10, there are shown a block diagram and a flowchart respectively illustrating the terminal 802 (e.g., LTE Rel-10 UE 802) and the method 1000 implemented therein in accordance with an embodiment of the present invention. As shown, the terminal 802 includes an antenna 902, a transceiver 904, a processor 906, a memory 908, and a soft buffer 910. The transceiver 904 is coupled to the antenna 902 and the processor 906. The processor 906 is coupled to the memory 906. The memory 906 contains the soft buffer 910. The skilled person will appreciate that alternate embodiments of the terminal 802 may include additional hardware and software beyond those shown in FIG. 9 which may be responsible for providing certain aspects of the terminal's functionality, including any of the functionality described herein and/or any functionality necessary to support the solution described herein. The terminal 802 also has many well known components (e.g., user interface, microphone) incorporated therein but for clarity those well known components are not described herein.

In one embodiment, the terminal 802 is configured to allocate the soft buffer 910 located therein by having the processor 906 interface with the memory 908 which stores processor-executable instructions and then execute the processor-executable instructions to allocate the soft buffer 910 by dividing the soft buffer into a plurality of sub-buffers based on a number of HARQ processes implemented by the terminal 802 and a total number of codewords to be transmitted over all configured or activated component carriers at step 1002. As shown in FIG. 9, particular embodiments of the terminal 802 may implement step 1002 by, for example, (i) dividing (e.g., equally) the soft buffer into sub-buffers amongst a number of HARQ processes (step 1002' in FIG. 10); and (ii) dividing each sub-buffer based on a total number of codewords to be transmitted across all configured or activated component carriers (step 1002" in FIG. 10).

Hence, the first aspect of this disclosure provides a terminal 802 which implements an efficient and robust soft buffer allocation method 1000. In particular embodiments, step 1002 may result in a sub-buffer size for a codeword given by the following equation (compare to equation no. 2):

$$N_{IR} = \left\lfloor \frac{N_{soft}/\min(M_{DL\_HARQ}, M_{limit})}{\sum_{j=0}^{N_{carrier}-1} K_{MIMO}(j)} \right\rfloor \quad (3)$$

To help illustrate some of the advantageous features of particular embodiments of the soft buffer allocation method 1000, four exemplary scenarios are considered next with respect to FIGS. 11-15.

Figure 11:
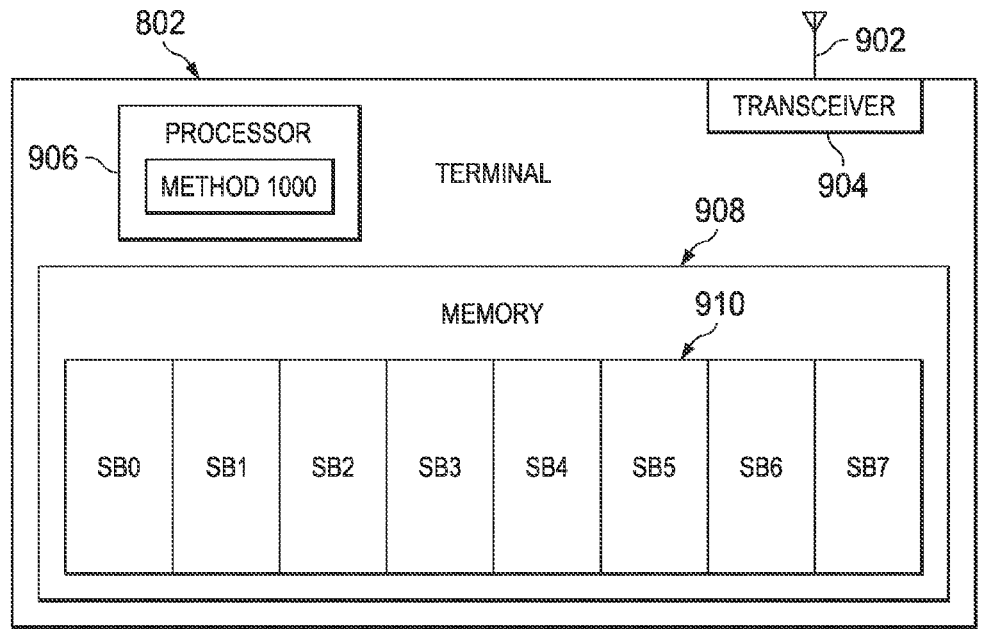
FIG. 11 is a block diagram illustrating the terminal shown in FIGS. 8-9 where the soft buffer located therein was allocated per the method shown in FIG. 10 after receiving an indication that the network node is configured to use a one component carrier and single-codeword PDSCH transmission.

Referring to FIG. 11, there is a block diagram of the terminal 802 where the soft buffer 910 located therein was allocated per an example embodiment of method 1000 after receiving an indication that the network node 804 is configured to use a one component carrier and single-codeword PDSCH transmission. As shown, terminal 802 includes the antenna 902, the transceiver 904, the processor 906, the memory 908, and the soft buffer 910. The soft buffer 910 has eight equally sized sub-buffers SB0, SB1, SB2, SB3, SB4, SB5, SB6 and SB7.

Figure 12:
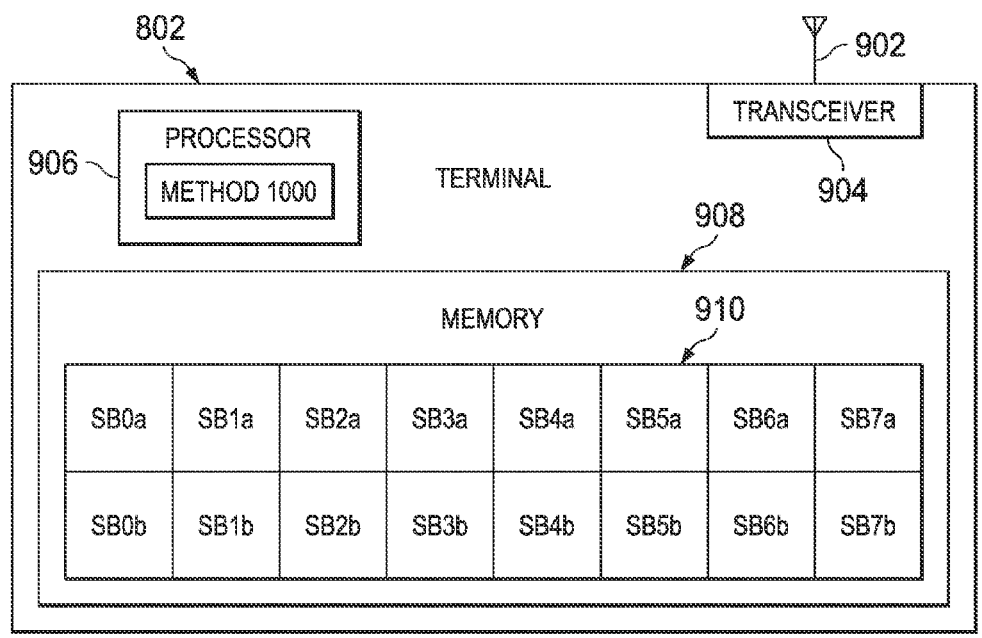
FIG. 12 is a block diagram illustrating the terminal shown in FIGS. 8-9 where the soft buffer located therein was allocated per the method shown in FIG. 10 after receiving an indication that the network node is configured to use a one component carrier and dual-codeword PDSCH transmission.

Referring to FIG. 12, there is a block diagram of the terminal 802 where the soft buffer 910 located therein was allocated per an example embodiment of method 1000 after receiving an indication that the network node 804 is configured to use a one component carrier and dual-codeword PDSCH transmission. As shown, terminal 802 includes the antenna 902, the transceiver 904, the processor 906, the memory 908, and the soft buffer 910. The soft buffer 910 has sixteen equally sized sub-buffers SB0a, SB0b, SB1a, SB1b . . . SB7a, SB7b.

Figure 13:
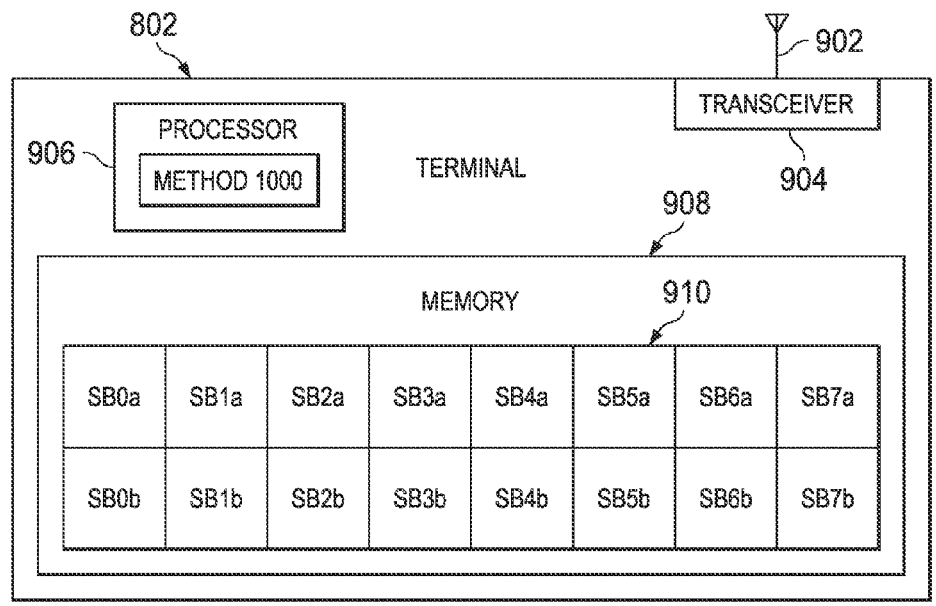
FIG. 13 is a block diagram illustrating the terminal shown in FIGS. 8-9 where the soft buffer located therein was allocated per the method shown in FIG. 10 after receiving an indication that the network node is configured to use a two component carrier and single-codeword PDSCH transmission.

Referring to FIG. 13, there is a block diagram of the terminal 802 where the soft buffer 910 located therein was allocated per an example embodiment of method 1000 after receiving an indication that the network node 804 is configured to use a two component carrier and single-codeword PDSCH transmission. As shown, terminal 802 includes the antenna 902, the transceiver 904, the processor 906, the memory 908, and the soft buffer 910. The soft buffer 910 has sixteen equally sized sub-buffers SB0a, SB0b, SB1a, SB1b . . . SB7a, SB7b.

Figure 14:
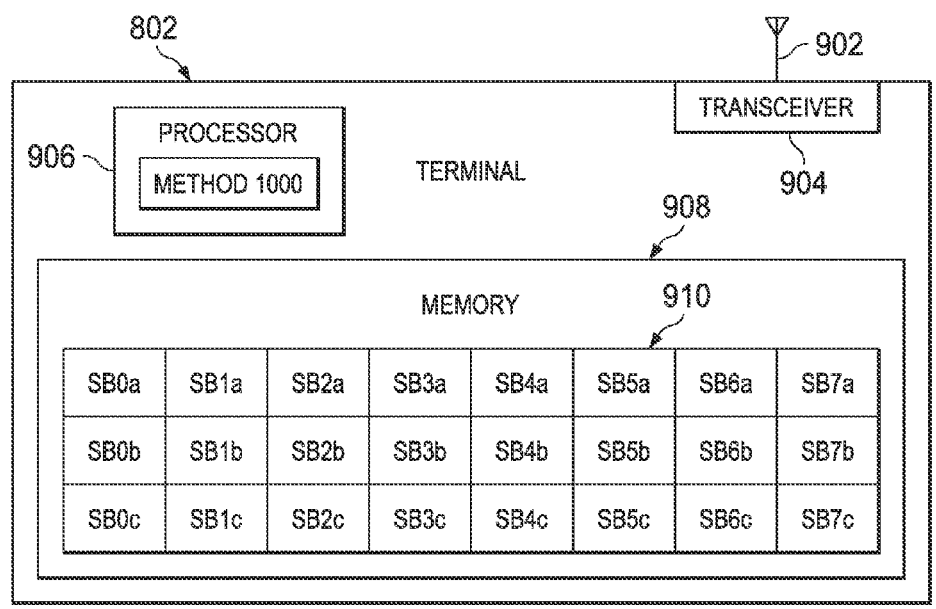
FIG. 14 is a block diagram illustrating the terminal shown in FIGS. 8-9 where the soft buffer located therein was allocated per the method shown in FIG. 10 after receiving an indication that the network node is configured to use a two component carrier where one component carrier is configured for single-codeword PDSCH transmissions and the other component carrier is configured for dual-codeword PDSCH transmission.

Referring to FIG. 14, there is a block diagram of the terminal 802 where the soft buffer 910 located therein was allocated per an example embodiment of method 1000 after receiving an indication that the network node 804 is configured to use a two component carrier where one component carrier is configured for single-codeword PDSCH transmissions and the other component carrier is configured for dual-codeword PDSCH transmission. As shown, terminal 802 includes the antenna 902, the transceiver 904, the processor 906, the memory 908, and the soft buffer 910. The soft buffer 910 has twenty-four equally sized sub-buffers SB0a, SB0b, SB0c, SB1a, SB1b, SB1c . . . SB7a, SB7b, SB7c.

Figure 15:
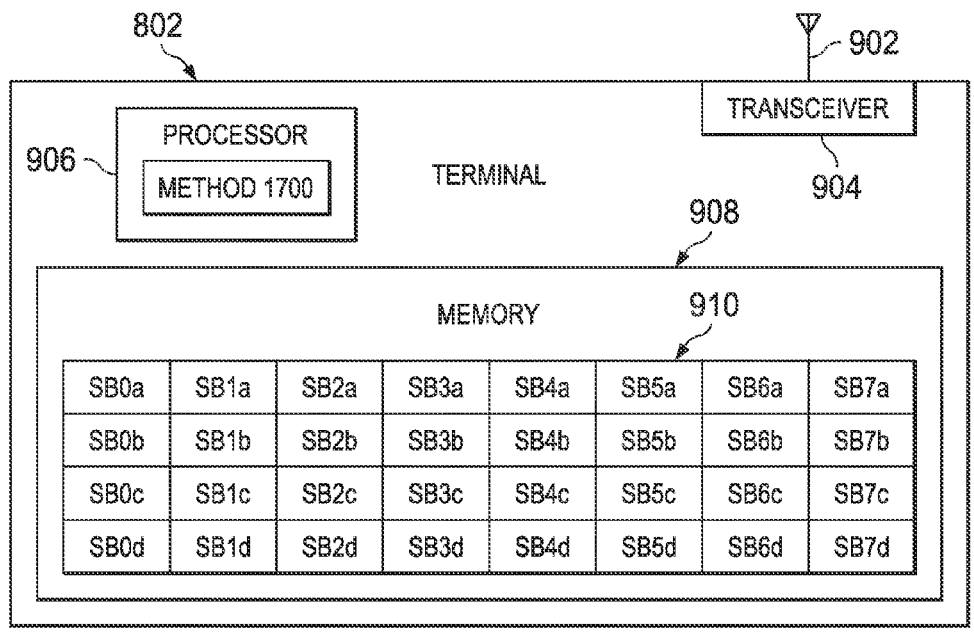
FIG. 15 is a block diagram illustrating the terminal shown in FIGS. 8-9 where the soft buffer located therein was allocated per the method shown in FIG. 10 after receiving an indication that the network node is configured to use a two component carrier and dual-codeword PDSCH transmission.

Referring to FIG. 15, there is a block diagram of the terminal 802 where the soft buffer 910 located therein was allocated per an example embodiment of method 1000 after receiving an indication that the network node 804 is configured to use a two component carrier and dual-codeword PDSCH transmission. As shown, terminal 802 includes the antenna 902, the transceiver 904, the processor 906, the memory 908, and the soft buffer 910. The soft buffer 910 has thirty-two equally sized sub-buffers SB0a, SB0b, SB0c, SB0d, SB1a, SB1b, SB1c, SB1d . . . SB7a, SB7b, SB7c, SB7d.

The benefits of certain embodiments of the described soft buffer allocation method 1000 include the following (for example):

To support PDSCH reception across multiple component carriers, the LTE-Rel-10 terminals 802 are equipped with larger total soft buffers 910 when compared to those equipped by traditional LTE Rel-8 terminals. In cases where the total configured codewords for a LTE-Rel-10 terminal 802 are on the same order as those in the traditional LTE Rel-8 terminal, the entire soft buffer memory is utilized and the soft buffer 910 reserved for each codeword is increased significantly when compared to the size available in the LTE Rel-8 terminal. This is a significant improvement over the aforementioned alternative methods, where half of the soft buffer 910 memory may be idle and wasted when the LTE Rel-10 terminal 802 is configured for only one component carrier. In addition, since the full soft buffer 910 is provided even for the highest transmission rates, the described soft buffer allocation method 1000 may increase the incremental redundancy gains and can improve system-wide data throughput.

The boundaries between different HARQ processes are according to the soft buffer allocation method 1000. This prevents operating errors in one HARQ process from spilling over to other HARQ processes.

The following is a brief summary of the basic features of traditional soft buffer allocation methods and the new soft buffer allocation method 1000:

LTE Rel-8 (PRIOR ART): Boundaries between HARQ processes are fixed. Boundaries between sub-processes within a process are not fixed.

Figure 1:
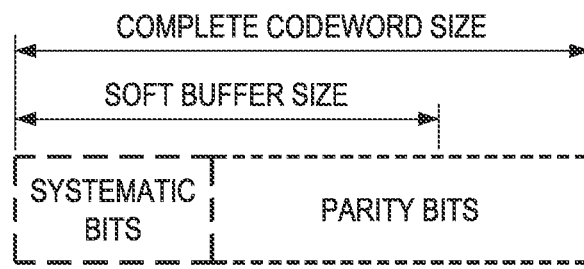
FIG. 1 (PRIOR ART) is a diagram illustrating a simplified complete codeword and it also illustrates how many softbits that can be stored by a terminal.
Figure 2:
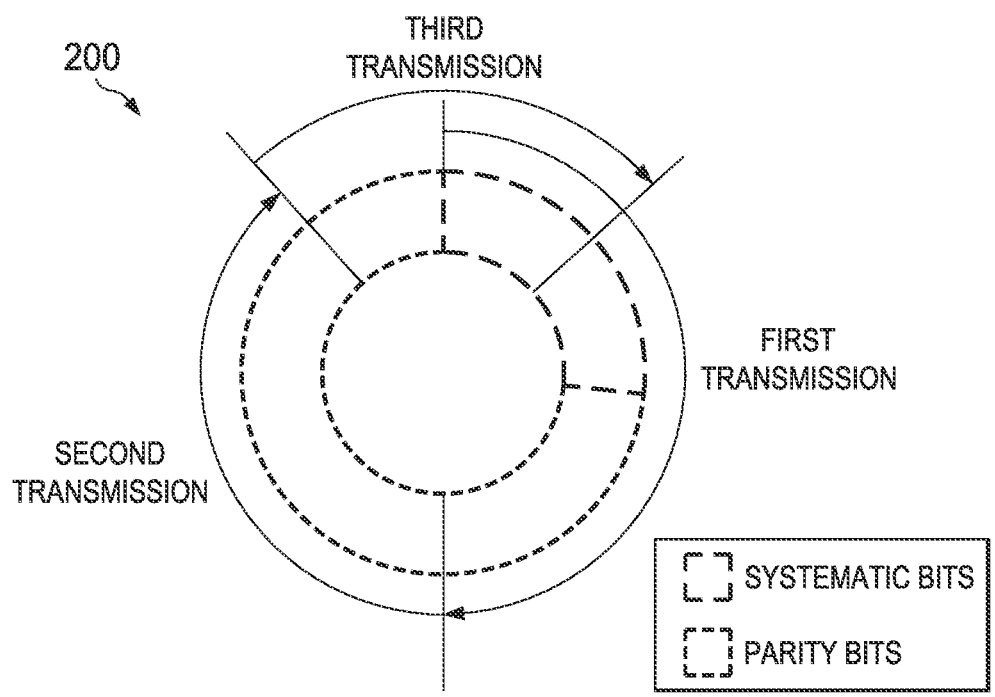
FIG. 2 (PRIOR ART) is a diagram illustrating a circular soft buffer that can be used in a terminal.
Figure 3:
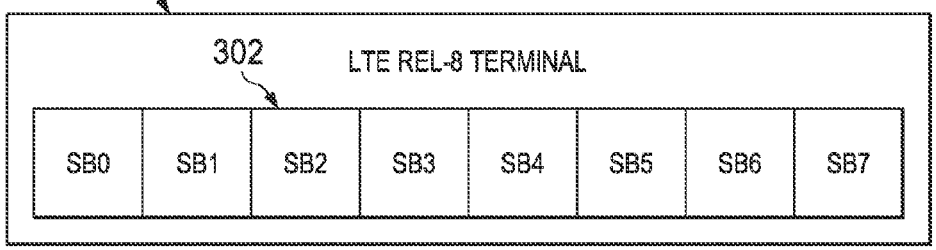
FIG. 3 (PRIOR ART) is a diagram illustrating a traditional LTE Rel-8 terminal with a soft buffer that has been allocated for single-codeword transmission modes or when the PDSCH transmission mode is other than mode 3, 4 or 8.
Figure 4:
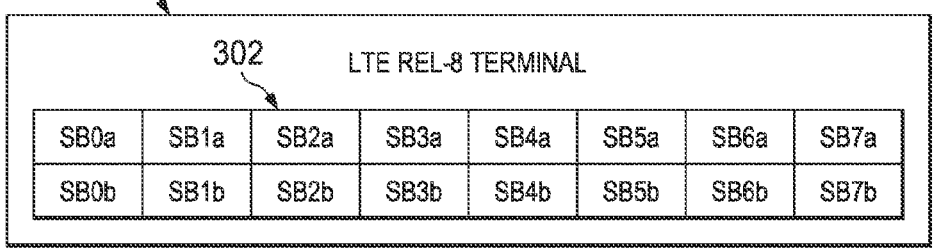
FIG. 4 (PRIOR ART) is a diagram illustrating a traditional LTE Rel-8 terminal where the soft buffer has been allocated for dual-codeword transmission modes or when the PDSCH transmission mode is mode 3, 4 or 8.
Figure 5:
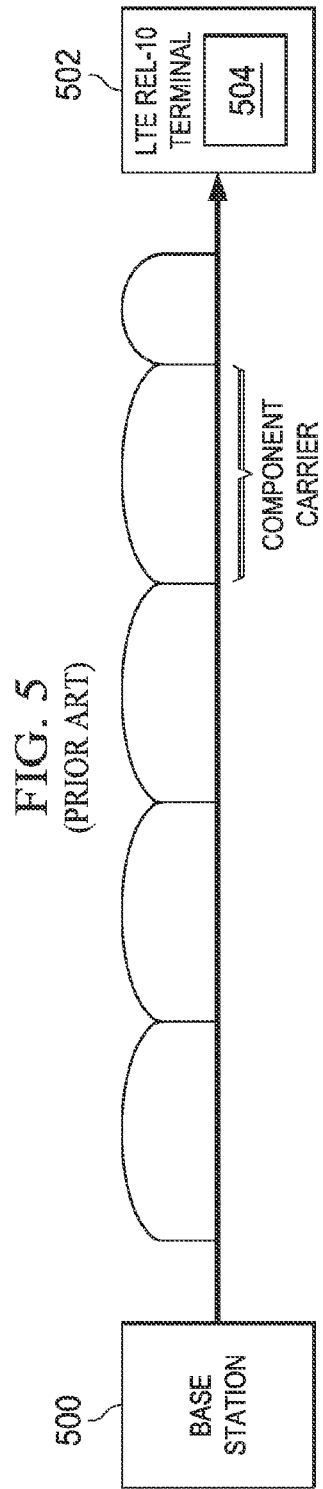
FIG. 5 (PRIOR ART) is a diagram illustrating a known carrier aggregation technique that can be used between a traditional base station and a traditional LTE Rel-10 terminal.
Figure 6:
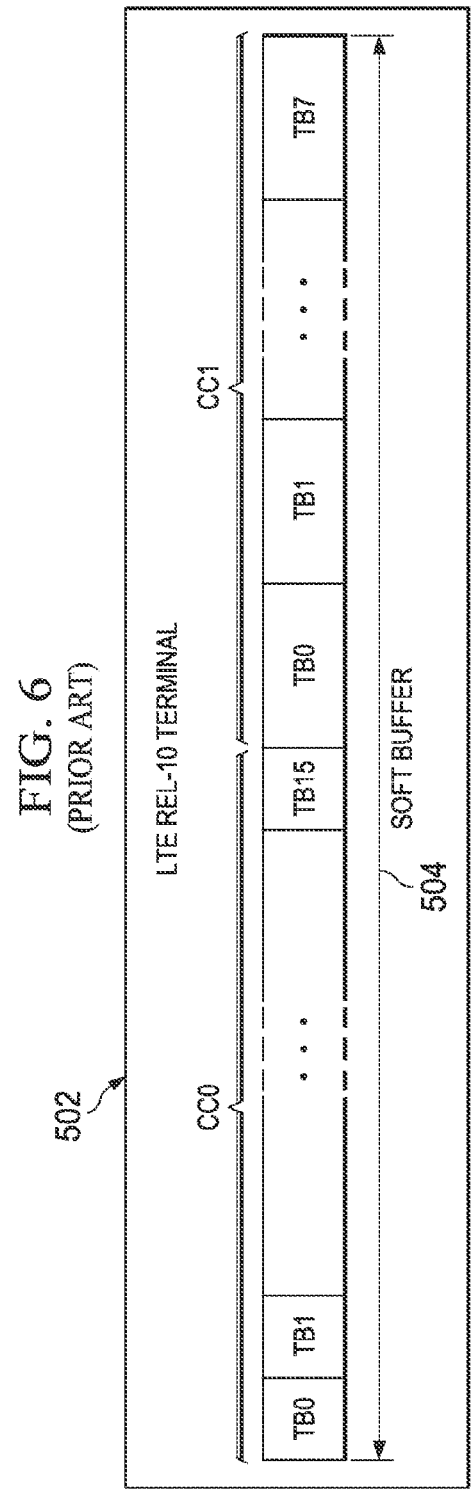
FIG. 6 (PRIOR ART) is a diagram illustrating a traditional LTE Rel-10 terminal which has a soft buffer that was allocated pursuant to a known soft buffer allocation method.

CATT 1 (PRIOR ART—SEE FIG. 6): Boundaries between HARQ processes and component carriers are fixed. Boundaries between sub-processes within a process are not fixed.

Figure 7:
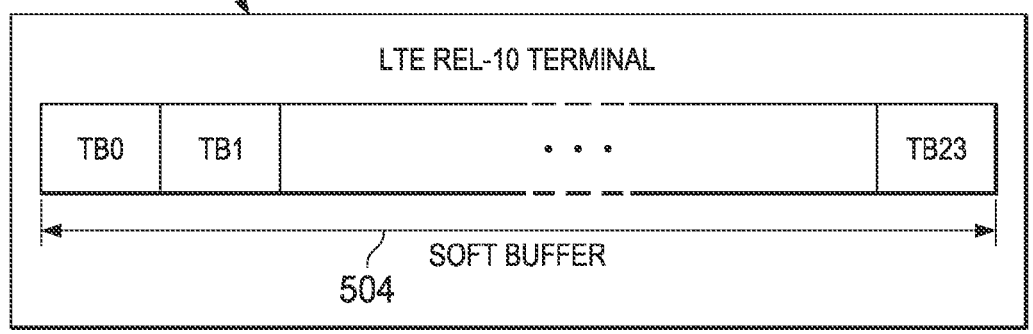
FIG. 7 (PRIOR ART) is a diagram illustrating a traditional LTE Rel-10 terminal which has a soft buffer that was allocated pursuant to another known soft buffer allocation method.

CATT 2 (PRIOR ART—SEE FIG. 7): No boundary is fixed.

Soft Buffer Allocation Method 1000: Boundaries between HARQ processes are fixed. Boundaries between component carriers and sub-processes within a process are not fixed.

Figure 16:
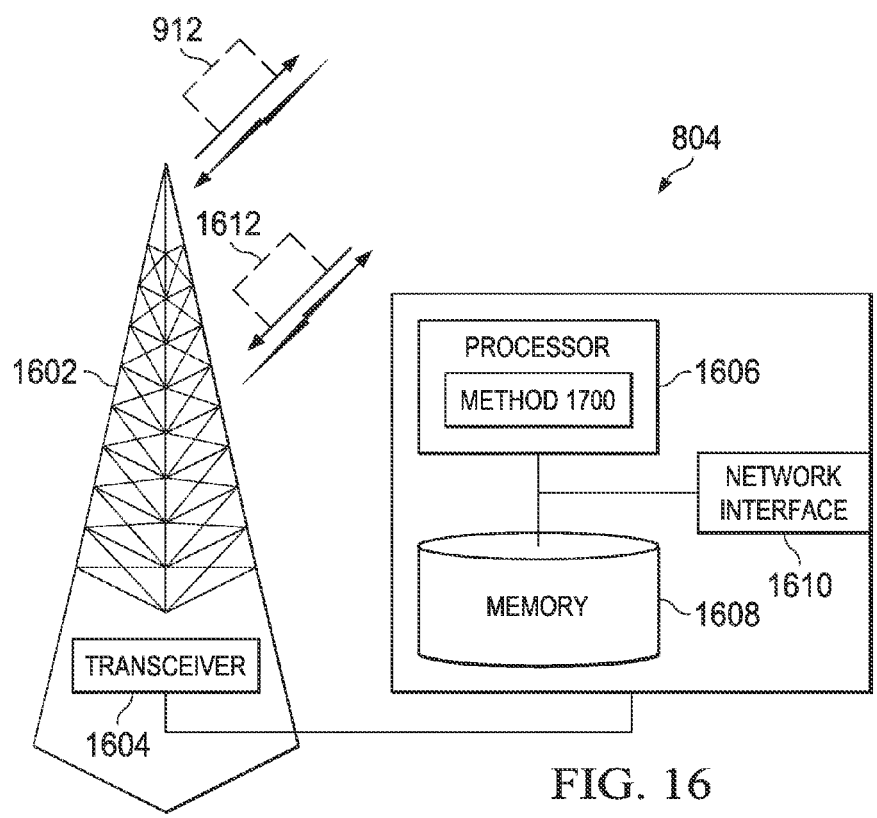
FIG. 16 is a block diagram illustrating in greater detail the network node shown in FIG. 8 configured in accordance with an embodiment of the present invention.
Figure 17:
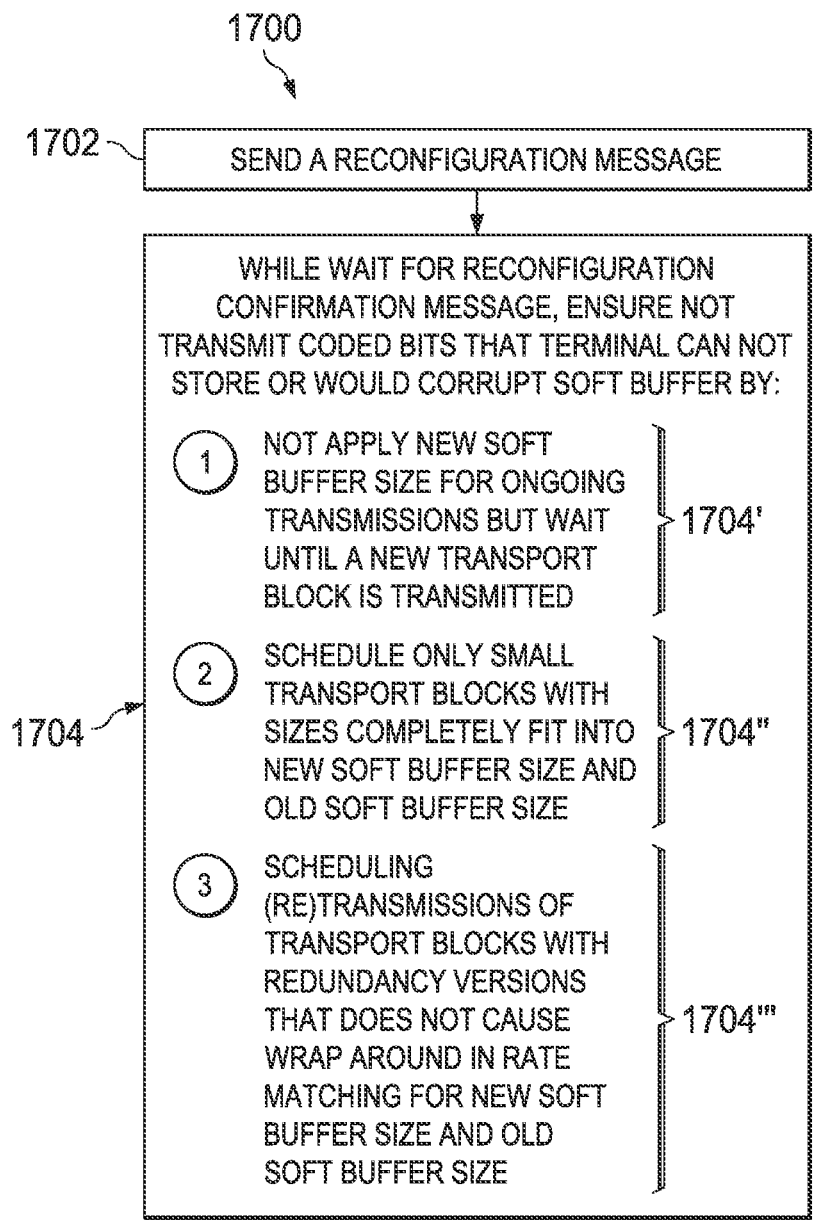
FIG. 17 is a flowchart illustrating an exemplary method implemented by the network node shown in FIGS. 8 and 16 for facilitating robust operations during a reconfiguration period while a terminal allocates a soft buffer located therein in accordance with an embodiment of the present invention.

Referring to FIGS. 16 and 17, there are shown a block diagram and a flowchart respectively illustrating the network node 804 (e.g., base station 804, eNB 804) and the method 1700 implemented therein in accordance with an embodiment of the present invention. As shown, the network node 804 includes an antenna 1602, a transceiver 1604, a processor 1606, a memory 1608, and a network interface 1610. The transceiver 1604 is coupled to the antenna 1602 and the processor 1606. The processor 1606 is coupled to the memory 1608 and the network interface 1610. The network interface 1610 is coupled to the wireless network (see FIG. 8). The skilled person will appreciate that alternate embodiments of the network node 804 may include additional hardware and software beyond those shown in FIG. 16 that may be responsible for providing certain aspects of the terminal's functionality, including any of the functionality described herein and/or any functionality necessary to support the solution described herein. The network node 804 also has many well known components incorporated therein but for clarity those well known components are not described herein.

In one embodiment, the network node 804 may be configured to utilize knowledge of the allocation performed by the terminal 802 to properly select the amount of coded bits to transmit to the terminal 802. In particular, the network node 804 may adapt its rate matching when encoding a codeword to correspond to the appropriate memory size allocated in the terminal 802 for purposes of receiving a codeword. More specifically, particular embodiments of the network node 804 may determine the amount of allocated memory and/or other aspects of the encoding scheme to be used, based on the number of HARQ processes implemented by the terminal 802 and the number of codewords that are possible to be transmitted to the terminal 802 over all configured or activated component carriers.

To illustrate, assume an example soft buffer 910 has an overall size of 256 bits and is subdivided as shown in FIG. 15 (i.e., with sub-buffers allocated for dual-codeword transmission on two components carriers to be processed by 8 HARQ processes), resulting in 32 sub-buffers of 8 bits each. Thus, in this example, the network node 804 may determine the amount of memory reserved in the terminal 802 for purposes of receiving a codeword based on the number of HARQ processes implemented by the terminal 802 (i.e., 8 in this example) and the number of codewords that is possible to be transmitted across all configured or activated component carriers (i.e., here, 2 codewords for each of 2 component carriers, or 4 total codewords per HARQ process) to ensure that the resulting codewords transmitted do not contain more than 8 unique bits. The network node 804 may then encode data for transmission to the terminal 802 in accordance with the determined memory size to ensure the codewords include a number of unique coded bits that matches and/or does not exceed the size of the individual sub-buffers allocated by the terminal 802. In particular embodiments, the network node 804 may repeat these unique coded bits serially or in another suitable manner that is predetermined and known by both the network node 804 and the terminal 802. For example, the network node 804 can transmit 16 bits by repeating the 8 unique coded bits 2 times each for a given codeword. In such embodiments, the network node 804 may determine the number of unique coded bits to include in the codeword (before any such repetition is applied) based on the number of HARQ processes implemented and the number of codewords that is possible to be transmitted across all configured or activated component carriers as described. After encoding the data (and applying any appropriate repetition to the unique encoded bits), the network node 804 can then transmit the encoded data to the terminal 802.

Furthermore, in one embodiment, the network node 804 is configured to facilitate robust operations during a reconfiguration period while the terminal 802 (e.g., LTE Rel-8 terminal 802, LTE Rel-10 terminal 802) allocates the soft buffer 910 located therein by having the processor 1606 interface with the memory 1608 which stores processor-executable instructions and then execute the processor-executable instructions to enable the following: (a) send a reconfiguration message 912 to the terminal 802, where the reconfiguration message 912 indicates a new reconfiguration of component carriers or a transmission mode of one or more component carriers to be used to interface with the terminal 802 (see step 1702 in FIG. 17); and (b) while waiting to receive a reconfiguration confirmation message 1612 indicating that the terminal 802 has allocated the soft buffer 910 based on the received reconfiguration message 912, ensure not to transmit coded bits that the terminal 802 cannot store or would corrupt the soft buffer 910

(see step 1704 in FIG. 17). A detailed discussion is provided next about three exemplary steps 1704', 1704" and 1704''' that the network node 804 can use to ensure it does not transmit coded bits that the terminal 802 cannot store or would corrupt the soft buffer 910. It is possible to only one out of the three steps are performed to allow the network node 804 to always communicate with the terminal 802.

In step 1704', the network node 804 can ensure it does not transmit coded bits that the terminal 802 cannot store or would corrupt the soft buffer 910 by not applying the new soft buffer size which results out of the new reconfiguration immediately for the ongoing transmissions of transport blocks but instead keep using the current soft buffer size for the HARQ process until a new transport block is transmitted to the terminal 802 using the HARQ process. In LTE, the new data indicator is used to indicate a new transport block. In other words, if a transport block has started to be transmitted within a HARQ process using a certain soft buffer size then the network node 804 should not alter this size for subsequent re-transmissions. The earliest possible time the new soft buffer size could be applied is for the first transmission of a new codeword (e.g., the new data indicator indicates new transport block) after transmission/reception of the reconfiguration message 912 (e.g., RRCConnectionReconfiguration 912). This implies that both the terminal 802 and the network node 804 use the old soft buffer size for all ongoing transmissions and start to use the new soft buffer size for new transport blocks which are transmitted after the RRCConnectionReconfiguration 912 has been sent to the terminal 804.

Figure 18:
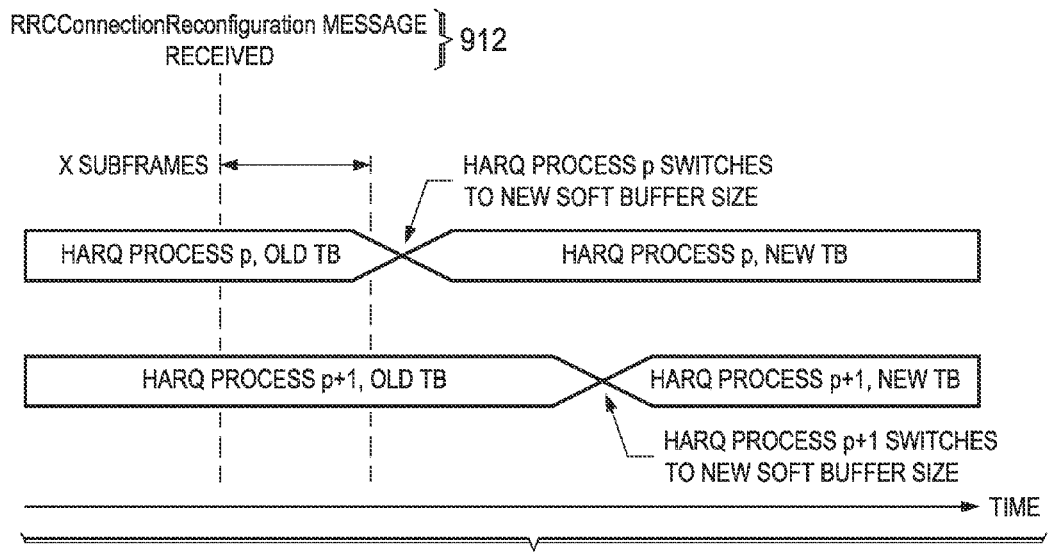
FIGS. 18 and 19 are diagrams used to help explain an exemplary way that the network node and the terminal could interact with one another to facilitate robust operations during a reconfiguration period while the terminal allocates a soft buffer located therein in accordance with an embodiment of the present invention.

Alternatively, the network node 804 could use the new soft buffer size from subframe n+x on where n denotes the subframe where the RRCConnectionReconfiguration 912 is transmitted/received. This would give the terminal 804 time to decode the RRCConnectionReconfiguration message 912. However, even now a certain—but smaller—uncertainty window remains whether the terminal 802 is fast enough to apply the new configuration already during reception of the of the new transport block or not. According to the LTE specification the terminal has 15 ms to apply the new configuration. If a new transport block is received immediately after reception of RRCConnectionReconfiguration message 912 it is questionable if the terminal 802 already uses the new configuration. FIG. 18 illustrates this scheme where the terminal 802 should start to use the new soft buffer 910 sizes for reception of new transport blocks x subframes after receiving the RRCConnectionReconfiguration message 912. However, if x is small then the terminal 802 may not be able to apply the new configuration of the soft buffer 910.

Figure 19:
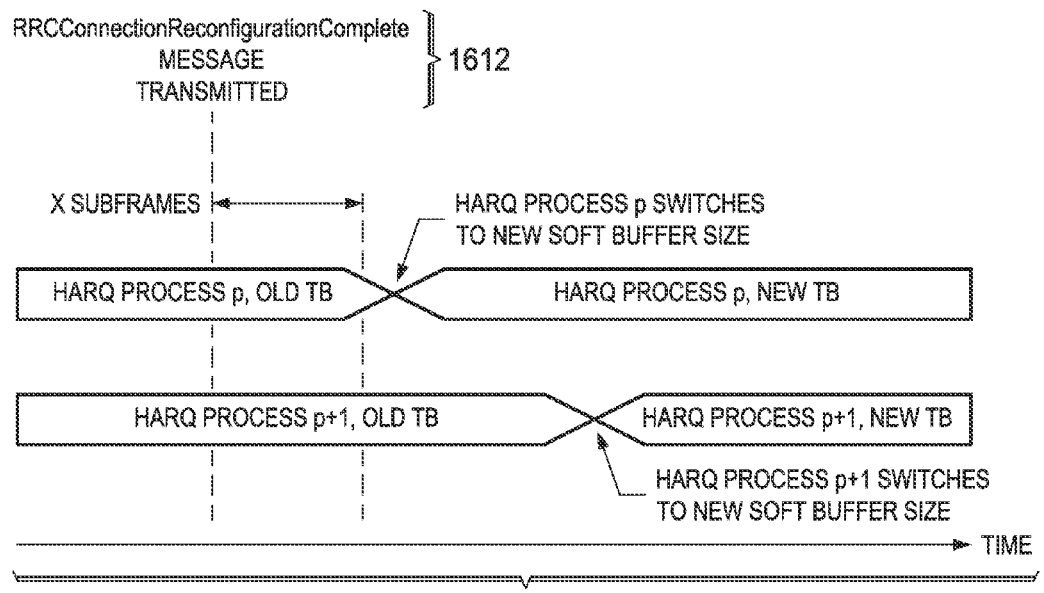

This uncertainty time period can be further reduced by applying the old soft buffer sizes for all HARQ processes until the reconfiguration confirmation message 1612 (e.g., RRCConnectionReconfigurationComplete message 1612) has been sent by the terminal 802 to the network node 804. Assuming that the terminal 802 transmits the RRCConnectionReconfigurationComplete message 1612 in subframe m, it should start to use the new soft buffer size for transport blocks which first transmission is received in subframe m+x or later from the network node 804. For example, if x is equal to 4 this would give the network node 804 enough time to decode the RRCConnectionReconfigurationComplete message 1612 and assume it is ok to use the new soft buffer size for scheduling a new transport block in subframe m+4. The only remaining uncertainty is now if RRCConnectionReconfigurationComplete message 1612 is not successfully received by network node 804. FIG. 19 illustrates this scheme where the terminal 802 starts to use new soft buffer sizes for reception of new transport blocks x subframes after it transmitted the RRCConnectionReconfigurationComplete message 1612.

In step 1704", the network node 804 can ensure it does not transmit coded bits that the terminal 802 cannot store or would corrupt the soft buffer 910 by scheduling only small transport blocks with sizes which completely fit into a new soft buffer size which results out of the new reconfiguration and an old soft buffer size. In particular, the network node 804 would schedule only small transport block sizes during the RRC uncertainty time window such that the terminal's available soft buffer 910 is sufficient to store the complete codeword and even if the soft buffer size has been changed it still can store the complete codeword.

The network node 804 while performing step 1704" might still be transport blocks that are not yet correctly decoded by the terminal 802 which would not completely fit into both the old and new soft buffer size. Thus, to not lose data in this situation the terminal 802 can wait with transmitting the RRCConnectionReconfiguration complete message 1612 until all such retransmissions are completed. New data transmissions during this period should still follow the principle of step 1704" to prevent that new "problematic" retransmissions are introduced. This is especially important for retransmissions of secondary transport blocks when switching transmission mode from dual code word transmission to single codeword transmission or when reducing the number of carriers.

In step 1704''', the network node 804 can ensure it does not transmit coded bits that the terminal 802 cannot store or would corrupt the soft buffer 910 by scheduling transmissions or re-transmissions of transport blocks to the terminal 802 using redundancy versions that do not cause a wraparound in a rate matching for both a new soft buffer size which results out of the new reconfiguration and an old soft buffer size.

In view of the foregoing, the skilled person will readily appreciate that the new terminals 802, network nodes 804 and methods 1000 and 1700 can be implemented in any appropriate type of wireless communication system which supports a HARQ type process including, for example, LTE, HSDPA, WiMAX wireless communication systems. In fact, the wireless communication system can include at least one of the aforementioned terminal 802 (which implements method 1000) and at least one of the aforementioned network node 804 (which implements method 1700). As described above, the terminal 802 (e.g., LTE Rel-10 terminal 802) is configured to allocate the soft buffer 910 located therein by: (a) analyzing a reconfiguration message 912 received from network node 804, where the reconfiguration message 912 indicates a new reconfiguration of component carriers or a transmission mode of one or more component carriers that that will be used by the network node 804; and (b) allocating the soft buffer 910 based on the new reconfiguration message 912 by: (i) equally dividing a size of the soft buffer into sub-buffers amongst a number of HARQ processes; and (ii) dividing each sub-buffer into a total number of codewords across all configured or activated component carriers. The network node 804 is configured to facilitate robust operations during a reconfiguration period while the terminal 802 (e.g., LTE Rel-8 terminal 802, LTE Rel-10 terminal 802) allocates the soft buffer 910 located therein by: (a) sending the reconfiguration message 912 to the terminal 802, where the reconfiguration message 912 indicates a new reconfiguration of component carriers or a transmission mode of one or more component carriers to be used to interface with the terminal 802; and (b) while waiting to receive a reconfiguration confirmation message 1612 indicating that the terminal 802 has allocated the soft buffer 910 based on the received reconfiguration message 912, ensure not to transmit coded bits that the terminal 802 cannot store or would corrupt the soft buffer 910 (e.g., steps 1704', 1704" and 1704' are three exemplary ways that the network node 804 can follow to ensure it does not transmit coded bits that the terminal 802 cannot store or would corrupt the soft buffer 910).

The skilled person will also readily appreciate that the new terminals 802, network nodes 804 and methods 1000 and 1700 provide significant advantages. For example, the entire soft buffer memory is fully utilized and the soft buffer reserved for each codeword is increased significantly when possible. Since a full soft buffer is provided even for the highest transmission rates, particular embodiments of the present invention may increase the incremental redundancy gains and can improve system-wide data throughput. Plus, since the boundaries between different HARQ processes are determined according to the method 1000 described above this prevents operating errors in one HARQ process from spilling over to other HARQ processes. Furthermore, particular embodiments of the present invention enable scheduling of terminals during re-configuration of component carriers while without this solution the terminal and network node would use, over a period of time, different soft buffer sizes, which would result in soft buffer corruption and higher-layer (RLC) re-transmissions.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A terminal that allocates a soft buffer located therein after interacting with a network node, the terminal comprising:
   a processor; and
   a memory that stores processor-executable instructions where the processor interfaces with the memory and executes the processor-executable instructions to enable following:
   analyze a reconfiguration message received from the network node, wherein the reconfiguration message indicates a new reconfiguration of component carriers or a transmission mode of one or more component carriers that will be used by the network node; and
   allocate the soft buffer based on the analysis of the reconfiguration message by:
      equally dividing a size of the soft buffer into sub-buffers based on a number of Hybrid Automatic Repeat Requests (HARQ) processes; and
      subdividing each sub-buffer based on a total number of codewords to be transmitted over all configured or activated component carriers.

2. The terminal of claim 1, wherein the allocation of the soft buffer results in a sub-buffer size for a codeword given by following equation:

$$N_{IR} = \left\lfloor \frac{N_{soft}/\min(M_{DL\_HARQ}, M_{limit})}{\sum_{j=0}^{N_{carrier}-1} K_{MIMO}(j)} \right\rfloor$$

where:
$N_{IR}$ is soft buffer size in bits;
$N_{soft}$ is the total number of soft channel bits;

$K_{MIMO}(j)$ is the number codewords configured for the component carrier j;
$M_{DL\_HARQ}$ is the maximum number of downlink HARQ processes; and
$M_{limit}$ is a constant equal to 8.

3. The terminal of claim 1, wherein if the reconfiguration message indicates that the network node is configured to use a one component carrier and a single-codeword Physical Downlink Shared Channel (PDSCH) transmission then the allocated soft buffer has eight equally sized sub-buffers.

4. The terminal of claim 1, wherein if the reconfiguration message indicates that the network node is configured to use a one component carrier and a dual-codeword Physical Downlink Shared Channel (PDSCH) transmission then the allocated soft buffer has sixteen equally sized sub-buffers.

5. The terminal of claim 1, wherein if the reconfiguration message indicates that the network node is configured to use a two component carrier and a single-codeword Physical Downlink Shared Channel (PDSCH) transmission then the allocated soft buffer has sixteen equally sized sub-buffers.

6. The terminal of claim 1, wherein if the reconfiguration message indicates that the network node is configured to use a two component carrier where one component carrier is configured for single-codeword Physical Downlink Shared Channel (PDSCH) transmissions and the other component carrier is configured for dual-codeword PDSCH transmission then the allocated soft buffer has twenty-four equally sized sub-buffers.

7. The terminal of claim 1, wherein if the reconfiguration message indicates that the network node is configured to use a two component carrier and dual-codeword Physical Downlink Shared Channel (PDSCH) transmission then the allocated soft buffer has thirty-two equally sized sub-buffers.

8. The terminal of claim 1, wherein the processor further executes the processor-executable instructions to send, to the network node, a reconfiguration confirmation message indicating that the soft buffer has been allocated based on the received reconfiguration message.

9. The terminal of claim 1, wherein the terminal is a Long-Term Evolution (LTE) Release 10 terminal.

10. A method in a terminal for allocating a soft buffer located therein after interacting with a network node, the method comprising:
    analyzing a reconfiguration message received from the network node, where the reconfiguration message indicates a new reconfiguration of component carriers or a transmission mode of one or more component carriers that will be used by the network node; and
    allocating the soft buffer based on the new reconfiguration message by:
       equally dividing a size of the soft buffer into sub-buffers based on a number of Hybrid Automatic Repeat Requests (HARQ) processes; and
       subdividing each sub-buffer based on a total number of codewords to be transmitted over all configured or activated component carriers.

11. The method of claim 10, wherein the allocation of the soft buffer results n a sub-buffer size for a codeword given by following equation:

$$N_{IR} = \left\lfloor \frac{N_{soft}/\min(M_{DL\_HARQ}, M_{limit})}{\sum_{j=0}^{N_{carrier}-1} K_{MIMO}(j)} \right\rfloor$$

where:

$N_{IR}$ is soft buffer size in bits;

$N_{soft}$ is the total number of soft channel bits;

$K_{MIMO}(j)$ is the number codewords configured for the component carrier j;

$M_{DL\_HARQ}$ is the maximum number of downlink HARQ processes; and $M_{limit}$ is a constant equal to 8.

12. The method of claim 10, wherein if the reconfiguration message indicates that the network node is configured to use a one component carrier and a single-codeword Physical Downlink Shared Channel (PDSCH) transmission then the allocated soft buffer has eight equally sized sub-buffers.

13. The method of claim 10, wherein if the reconfiguration message indicates that the network node is configured to use a one component carrier and a dual-codeword Physical Downlink Shared Channel (PDSCH) transmission then the allocated soft buffer has sixteen equally sized sub-buffers.

14. The method of claim 10, wherein if the reconfiguration message indicates that the network node is configured to use a two component carrier and a single-codeword Physical Downlink Shared Channel (PDSCH) transmission then the allocated soft buffer has sixteen equally sized sub-buffers.

15. The method of claim 10, wherein if the reconfiguration message indicates that the network node is configured to use a two component carrier where one component carrier is configured for single-codeword Physical Downlink Shared Channel (PDSCH) transmissions and the other component carrier is configured for dual-codeword PDSCH transmission then the allocated soft buffer has twenty-four equally sized sub-buffers.

16. The method of claim 10, wherein if the reconfiguration message indicates that the network node is configured to use a two component carrier and dual-codeword Physical Downlink Shared Channel (PDSCH) transmission then the allocated soft buffer has thirty-two equally sized sub-buffers.

17. The method of claim 10, further comprising the step of sending, to the network node, a reconfiguration confirmation message indicating that the soft buffer has been allocated based on the received reconfiguration message.

18. The method of claim 10, wherein the ter a Long-Term Evolution (LTE) Release 10 terminal.

19. A network node that interacts with a termina, the network node comprising:

a processor; and a memory that stores processor-executable instructions where the processor interfaces with the memory and executes the processor-executable instructions to enable following:

transmit a reconfiguration message to the terminal, wherein the reconfiguration message indicates a new reconfiguration of component carriers or a transmission mode of one or more component carriers that will be used by the network node to interact with the terminal; and, understand that the terminal will allocate a soft buffer located therein based on the reconfiguration message as follows:

equally divide a size of the soft buffer into sub-buffers based on a number of Hybrid Automatic Repeat Requests (HARQ) processes; and, subdivide each sub-buffer based on a total number of codewords to be transmitted over all configured or activated component carriers.

20. The network node of claim 19, wherein the processor further executes the processor-executable instructions to refrain from transmitting coded bits that the terminal cannot store or that would corrupt the soft buffer while waiting to receive a reconfiguration confirmation message which indicates that the terminal has allocated the soft buffer based on the received reconfiguration message.

21. A method in a network node that interacts with a terminal, the method comprising:

transmitting a reconfiguration message to the terminal, wherein the reconfiguration message indicates a new reconfiguration of component carriers or a transmission mode of one or more component carriers that will be used by the network node to interact with the terminal; and, understanding that the terminal will allocate a soft buffer located therein based on the reconfiguration message as follows:

equally divide a size of the soft buffer into sub-buffers based on a number of Hybrid Automatic Repeat Requests (HARQ) processes; and, subdivide each sub-buffer based on a total number of codewords to be transmitted over all configured or activated component carriers.

22. The method of claim 21, further comprising:

refraining from transmitting coded bits that the terminal cannot store or that would corrupt the soft buffer while waiting to receive a reconfiguration confirmation message which indicates that the terminal has allocated the soft buffer based on the received reconfiguration message.

* * * * *

UNITED STATES PATENT AND TRADEMARK OFFICE
CERTIFICATE OF CORRECTION

PATENT NO. : 9,172,520 B1  
APPLICATION NO. : 14/320934  
DATED : October 27, 2015  
INVENTOR(S) : Cheng et al.

Page 1 of 1

It is certified that error appears in the above-identified patent and that said Letters Patent is hereby corrected as shown below:

In The Specification

In Column 3, Line 15, delete "up to" and insert -- upto --, therefor.

In Column 9, Line 45, delete "memory 906. The memory 906" and insert -- memory 908. The memory 908 --, therefor.

In Column 10, Line 39, delete "SB0b," and insert -- SB0b, --, therefor.

In Column 11, Line 4, delete "SB0a, SB0b," and insert -- SB0a, SB0b, --, therefor.

In Column 13, Line 30, delete "terminal 804." and insert -- terminal 802. --, therefor.

In Column 13, Line 34, delete "terminal 804" and insert -- terminal 802 --, therefor.

In Column 15, Line 3, delete "1704'" and insert -- 1704''' --, therefor.

In The Claims

In Column 16, Line 59, in Claim 11, delete "n" and insert -- in --, therefor.

Signed and Sealed this  
Fifteenth Day of March, 2016

Michelle K. Lee  
*Director of the United States Patent and Trademark Office*